No. 626,223. Patented June 6, 1899.
J. C. CRAMP.
SHAFT COUPLING.
(Application filed Apr. 13, 1898.)
(No Model.)
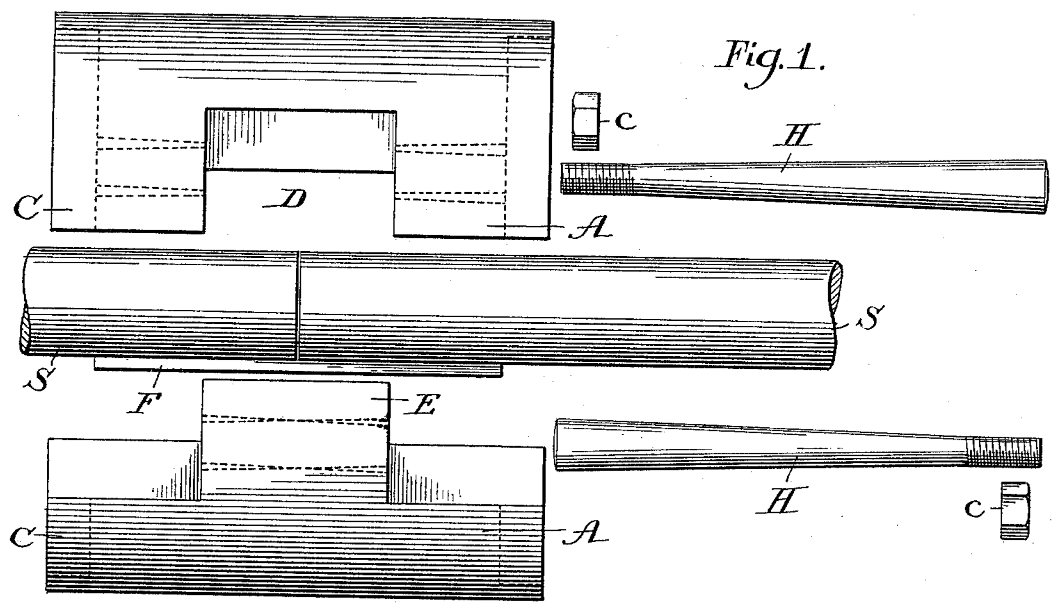
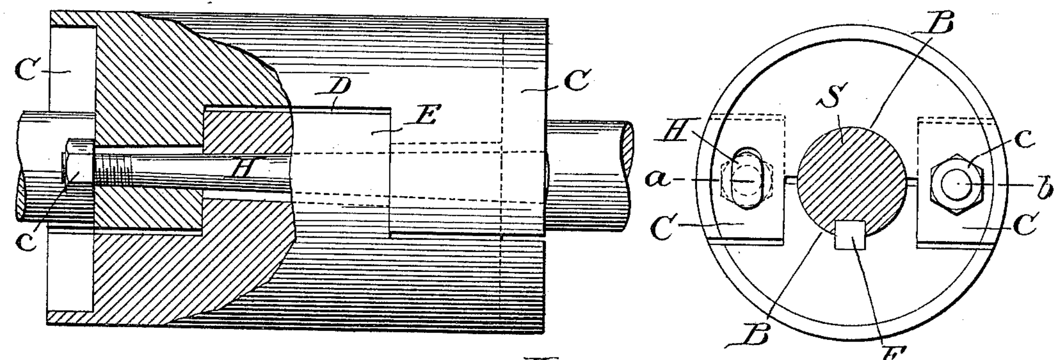
Fig. 4.
c
C
H
S
WITNESSES:
A. V. Groupe
C. E. Parker.
INVENTOR
Joseph C. Cramp
BY
H. V. Healow
ATTORNEY.
THE NORRIS PETERS CO., PHOTO-LITHO., WASHINGTON, D. C.

UNITED STATES PATENT OFFICE.

JOSEPH C. CRAMP, OF PHILADELPHIA, PENNSYLVANIA, ASSIGNOR OF ONE-THIRD TO WILBUR F. ROSE, OF SAME PLACE.

SHAFT-COUPLING.

SPECIFICATION forming part of Letters Patent No. 626,223, dated June 6, 1899.

Application filed April 13, 1898. Serial No. 677,425. (No model.)

*To all whom it may concern:*

Be it known that I, JOSEPH C. CRAMP, a citizen of the United States, and a resident of the city of Philadelphia, State of Pennsylvania, have invented certain new and useful Improvements in Shaft-Couplings, of which the following is a full, clear, and exact description, reference being had to the accompanying drawings, forming a part of this specification.

My invention relates to shaft-couplings for uniting the ends of two shafts or other analogous devices; and it has for its object to provide means for coupling the shaft ends without removing them from their bearings and in which the clamping mechanism is less likely to loosen its hold through vibration, the clamping force being exerted by devices arranged in pairs and acting against any tendency in each to become loose in the coupling.

To these ends my improved shaft-coupling consists of a clamp constructed in segmental halves provided with interfitting angular lugs and recesses and with longitudinally-extending perforations, in combination with a pair of tapered oval or slightly-flattened binding-screws inserted in opposite directions in the tapered perforations of the clamping-segments, whereby the latter are drawn together and firmly bear against and hold the shaft ends in coupled position.

In the accompanying drawings, illustrating my invention, Figure 1 is an elevation of the parts separately, showing the two shaft ends, the two segmental halves of the coupling, and the tapered binding-screws. Fig. 2 is an elevation, partly broken away to show a longitudinal section, of the said parts when coupled together. Fig. 3 is an end view, and Fig. 4 is a longitudinal section on the line *a b* of Fig. 3.

It will be observed that the two segmental halves A A of the clamp form when together a smooth cylindrical external periphery. These segmental halves are centrally bored out at B B, respectively, as shown in the end view, Fig. 3, and the ends longitudinally recessed annularly at C C, respectively, (see Figs. 2 and 4,) so that the retaining-nuts *c c* for the screw-bolts may be within such recesses. One of these segmental sections is provided at each side with a recess, as at D, Figs. 1 and 2, while the other section has lips or projections E, so that when the two sections are applied to each other the lips or protions of the one section will enter the recesses of the other section D. A feather or spline F (see Fig. 3) is preferably inserted between the peripheral surface of the shaft ends and the inner bored-out face of one or both of the segmental halves of the clamp. Said segmental halves are each longitudinally bored out with a tapered hole, (indicated by the dotted lines in Figs. 1 and 2,) the taper running in opposite directions in the two halves. Two taper-screws H H (see Fig. 3) are provided to fill the longitudinal tapered holes in the clamp-pieces. These taper-screws H H are preferably flattened on two opposite sides, so as to present the appearance in end view as shown on left-hand side of Fig. 3. When the ends of the shafts S S are to be coupled, the segmental clamp-sections are brought together around the shaft ends, the lips fitting into the recesses, the feather or spline inserted, then the taper-screws inserted from each opposite end, respectively, in the corresponding taper perforations in the segmental clamp-sections, and driven home, whereby the sections are pulled toward each other and tightly clamp or embrace the shaft ends, and this being accomplished the nuts *c c* are placed on the ends of the taper-screws.

I am aware of the patent to Miller, No. 245,652, of August 16, 1881, and disclaim the construction therein shown and described. My coupling differs from that of this patent in the arrangement and character of the interfitting projections and recesses and in the feature of the oppositely-driven bolts tapered on two sides only. It will be observed that I employ angular projections with corresponding recesses and that I provide both of the central projections on one member and both of the central recesses on the other member. This construction renders the sections reversible and also requires much less fitting or machining of the interfitting parts. By tapering the bolts upon those sides only in the direction in which their action in drawing the two members together is exerted I avoid lateral binding of the bolts and am at the same time enabled to make the apertures therefor in the projections so much the smaller, whereby said projections are weakened as little as possible.

My shaft-coupling, as shown and described, cannot ordinarily become loose from vibration. It can be applied without removing the shaft ends from their bearings. It is simple and does not require a skilled workman to apply or remove it. It retains its alinement and possesses other obvious inherent advantages notably due to the firm clamping force applied independently to each clamping-section.

Having thus described my invention, I claim as new and desire to secure by Letters Patent—

The herein-described coupling for shafts and the like, comprising two longitudinal sections, one of which is formed at its central portion at opposite edges with projecting angular projections of corresponding size and shape, and the other of which is formed with central angular recesses to receive the said projections, said sections having oppositely-tapered perforations passing respectively through said projections and intersecting said recesses, the oppositely-driven screws or bolts tapered upon two sides only, and engaging the said recesses, and locking-nuts on the threaded end portions of said screws or recesses, together with means for preventing the rotation of the coupling on the shaft ends, substantially as specified.

In testimony whereof I have hereunto affixed my signature this 7th day of April, A. D. 1898.

JOSEPH C. CRAMP.

Witnesses:
ISAAC ARROTT,
JAMES N. CARTER.